…

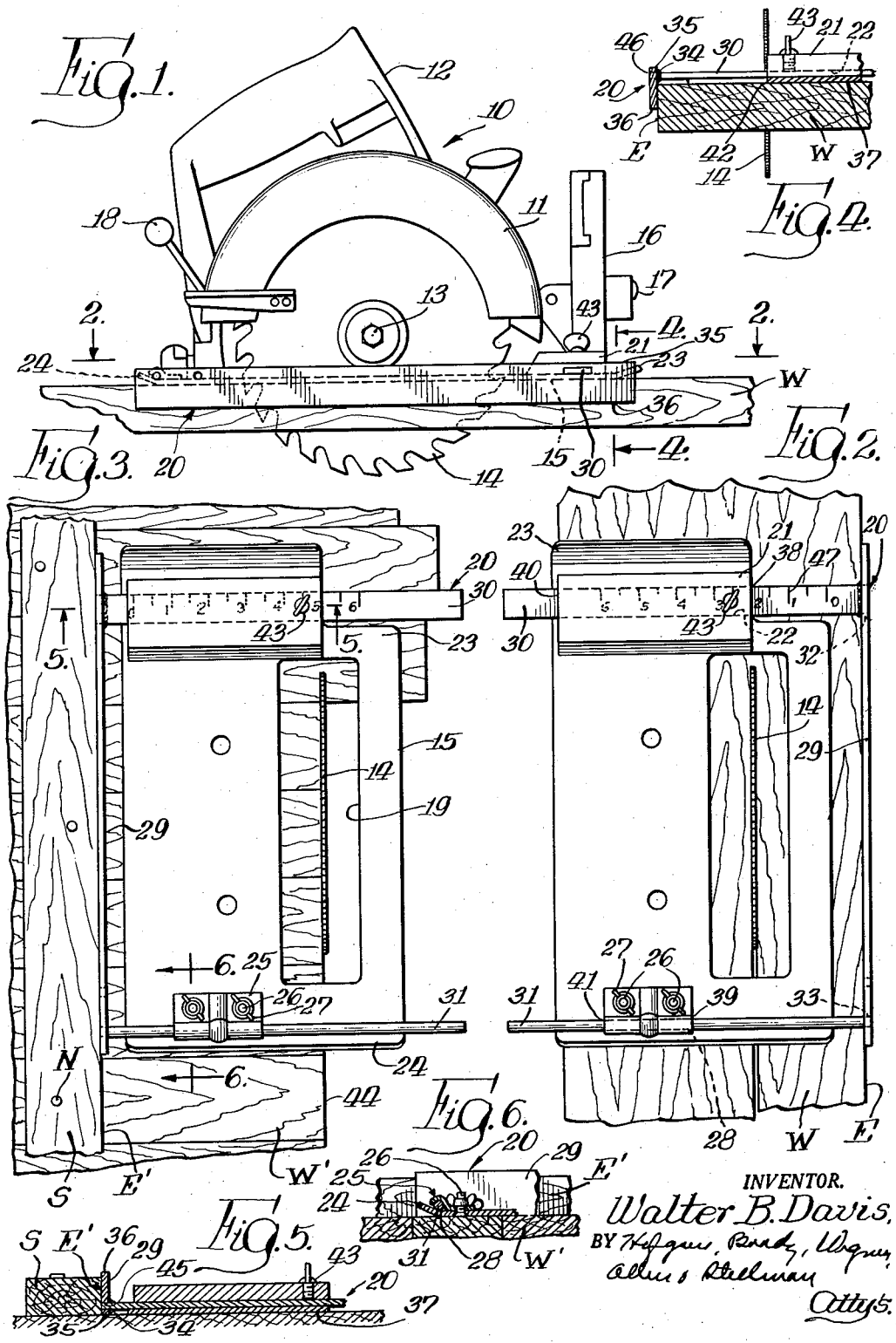

United States Patent Office 3,043,351
Patented July 10, 1962

3,043,351
EDGE GUIDE FOR USE WITH POWERED HAND SAWS
Walter B. Davis, Hinsdale, Ill., assignor to Portable Electric Tools, Inc., a corporation of Illinois
Filed Sept. 12, 1960, Ser. No. 55,247
2 Claims. (Cl. 143—43)

This invention relates to powered hand saws and in particular to means for guiding powered hand saws.

In the conventional powered hand saw, a rotary saw blade is driven by suitable means as an electric motor to cut work such as wood boards and panels with the operator moving the saw along the front surface of the work. To facilitate this operation, the powered hand saw is conventionally provided with a flat shoe arranged to carry the saw slidably on the front surface of the work. The shoe is provided with an open portion through which the rotary saw blade extends to engage the work.

The powered hand saw may be controlled by the operator to cut along a path visually followed by the operator. In certain cutting operations, however, as in ripping boards and the like, the movement of the saw is preferably by a guide device which moves along one edge of the work to maintain the saw blade parallel to that edge and at a preselected distance therefrom. The present invention is concerned with a new and improved form of such a guide means.

Thus, a principal object of the present invention is the provision of a new and improved means for guiding a powered hand saw.

Another object is to provide such a guide means arranged for selectively guiding the saw through a front surface and along a preselected line of work having an edge defining a surface juxtaposed parallel to the line and extending rearwardly from the front surface, and work having a shoulder defining a surface juxtaposed parallel to the line and extending forwardly from the front surface.

A further object is to provide such a guide means including a shoe for carrying the saw slidably on the front surface of the work, means on the shoe defining a pair of parallel channels extending longitudinally transversely to the flat plane of the saw blade, an elongate guide, a pair of parallel slides extending transversely to the guide from portions of the guide spaced corresponding to the spacing between the channels, said slides being arranged for longitudinally slidable positioning in said channels, and securing means associated with at least one channel means for locking releasably the slide therein.

Still another object is to provide such guide means wherein the guide includes a longitudinally extending front edge and a longitudinally extending rear edge, the slides being carried by the guide to dispose the rear edge below the rear plane of the shoe with the slides extending into one end of the channels, and dispose the front edge of the guide in the rear plane of the shoe and the rear edge forwardly thereof with the slides extending into the other end of the channels.

A yet further object is to provide such guide means effectively precluding improper association with the channel means.

Other features and advantages of this invention will be apparent from the following description taken in connection with the accompanying drawings wherein:

FIG. 1 is a side elevation of a powered hand saw provided with guide means embodying the invention in association with a portion of a workpiece;

FIG. 2 is a horizontal section taken substantially along the line 2—2 of FIG. 1;

FIG. 3 is a view generally similar to that of FIG. 2 but with the guide means reversely arranged for association with a shoulder means provided on the work;

FIG. 4 is a fragmentary vertical section taken substantially along the line 4—4 of FIG. 1;

FIG. 5 is a fragmentary vertical section taken substantially along the line 5—5 of FIG. 3; and FIG. 6 is a fragmentary vertical section taken substantially along the line 6—6 of FIG. 3.

In the exemplary embodiment of the invention as disclosed in the drawing, a powered hand saw generally designated 10 of generally conventional construction is shown to include a housing 11 carrying a handle 12 and enclosing a suitable electric motor (not shown) provided with a drive shaft 13 carrying a conventional rotary saw blade 14 for powered rotation about the axis of the shaft. A shoe 15 is pivotally associated with the housing 11 by means of a mounting device 16 including a control lever 17. A depth control device 18 of conventional construction is provided for adjusting the extension of the saw blade 14 downwardly through an opening 19 in the shoe in conformity with the thickness of the work W to be cut.

The present invention comprehends a guide means generally designated 20 selectively associated with the shoe 15 for guiding the saw 10 along a preselected line related selectively to an edge surface E of the work W or a shoulder surface E' of a shoulder defining strip S associated with work W'. More specifically, the guide means 20 may be arranged in one position, as seen in FIGS. 1, 2 and 4 for ripping the work W parallel to the side edge E thereof. Alternatively, the guide means 20 may be reversely arranged as shown in FIGS. 3, 5 and 6 to cut work W' such as roof boards of a house transversely thereto. The guide means 20 is arranged for facilitated arrangement in either of the alternative dispositions and provides a rigid accurate guide means in each disposition.

More specifically, the mounting device 16 includes a base portion 21 defining with the shoe 15 a channel 22 extending longitudinally transversely to the flat plane of the saw blade 14, in the illustrated embodiment the channel extends perpendicularly thereto. Base portion 21 is preferably arranged on the shoe 15 adjacent the leading end 23 thereof whereby it extends across the shoe in front of the blade 14. Adjacent the trailing end 24 of the shoe 15, a clamp 25 is secured to the shoe by suitable adjustable means such as bolts 26 and cooperating wing nuts 27 to define with the shoe a channel 28 extending parallel to channel 22 behind the saw blade 14. To preclude inadvertent improper association of the guide 20 with the shoe 15, the channel 22 may have a cross sectional configuration different from that of channel 28. In the illustrated embodiment, channel 22 is rectangular in cross section and channel 28 is circular.

An elongated bar guide 29 and a pair of slides 30 and 31 extending transversely to the guide 29 form portions 32 and 33 of the guide spaced substantially longitudinally thereof. In the illustrated embodiment, portions 32 and 33 are juxtaposed to the opposite ends of the guide. The spacing between the slides 30 and 31 corresponds to the spacing between channels 22 and 28. Slide 30 is complementary in cross section to channel 22 and slide 31 is complementary in cross section to channel 28, slide 30 comprising herein an elongated bar and slide 31 comprising an elongated cylindrical rod. The slides are rigidly secured to the guide 29 as by extension through suitable openings 45 and 46 therein and weld means 34 to maintain the slides in accurate parallel relationship perpendicular to the guide.

As best seen in FIGS. 4 and 5, the openings 45 and 46 are disposed closer to the front longitudinal edge 35 of the guide than to the rear longitudinal edge 36 thereof whereby the rear edge 36 is disposed below the rear plane 37 of the shoe 15 when the slides are arranged as shown in FIG. 2 to extend from the guide 29 through right-hand end 38 of the channel 22 and right-hand end 39 of the channel 28 toward the left-hand end 40 and 41 respectively thereof. Alternatively, in the reversed position of FIG. 3, the front edge 35 of the guide 29 is disposed in the plane of the rear surface 37 of the shoe and the rear edge 36 is disposed substantially forwardly thereof. Thus, in the arrangement of FIG. 2, the guide 29 may slide in facial engagement with the work edge surface E as seen in FIG. 4 to guide the saw blade 14 accurately along a line 42 extending parallel to the edge surface E. To lock the guide means 20 with the saw blade 14 thusly disposed relative to the edge surface E, a suitable clamp screw 43 may be passed through the base portion 21 to engage the slide 30 in channel 22. Thus, an accurate positive guide of the saw as in a ripping operation is obtained.

Where the work is to be cut transversely as shown in FIG. 3, the guide means 20 is reversely arranged so that the guide 29 may have sliding facial engagement with the shoulder surface E' of the strip S which may comprise a suitable board secured to the work W' by suitable means such as nails N to extend the shoulder surface E' parallel to the desired line on which the work is to be cut. The guide means 20 is adjusted in the channels 22 and 28 and locked in position by means of screw 43 to cause saw blade 14 to follow the line 44 along which the work is to be cut. A suitable scale 47 may be provided on the slide 30 for co-operation with the base portion 21 to measure the spacing of the guide 29 from the flat plane of the saw blade 14 for facilitated sawing. As best seen in FIG. 5, as the front edge 35 of the guide 29 is disposed in the plane of the rear surface 37 of the shoe, the edge 35 serves as an outboard support of the saw effectively precluding canting of the saw during the cutting operation and maintaining the cut accurately perpendicular to the surface of the work. Further, as the edge 35 extends the entire length of the guide 29, an effectively positive guiding action is obtained.

As the slides 30 and 31 are substantially spaced, skewing of the guide relative to the flat plane of the saw blade 14 is effectively precluded while yet the guide means may be formed of relatively thin elements which correspondingly may be relatively light and thereby adjusted with improved facility. Further, as the guide is supported at its opposite ends, it may have a substantial length, comparable to the length of the shoe 15, thereby providing improved guiding action in each of its alternative arrangements.

While I have shown and described one embodiment of my invention, it is to be understood that it is capable of many modifications. Changes, therefore, in the construction and arrangement may be made without departing from the spirit and scope of the invention as defined in the appended claims.

I claim:
1. In a powered hand saw having a rotary blade means for guiding the saw for selectively sawing, through a front surface and along a preselected line thereof, work having an edge defining a surface juxtaposed parallel to said line and extending rearwardly from the front surface, and work having a shoulder defining a surface juxtaposed parallel to said line and extending forwardly from the front surface, comprising: a shoe, for carrying the saw, slidable on the front surface of the work, said shoe having an open portion for extension of the saw blade therethrough; means on the shoe defining a pair of parallel open-ended channels extending longitudinally transversely to the flat plane of the saw blade; an elongate guide having a front, longitudinally extending edge and a rear, longitudinally extending edge; a pair of parallel slides extending transversely to the guide from portions of the guide spaced corresponding to the spacing between said channels, said slides being arranged for longitudinally slidable positioning in said channels and being carried by the guide to dispose the rear edge of the guide rearwardly of the rear plane of the shoe with the slides extending in one direction into one end of the channels, and dispose the front edge of the guide in the rear plane of the shoe and the rear edge forwardly thereof with the slides extending in an opposite direction into the other end of the channels, said slides having dissimilar cross sections and said channels having dissimilar cross sections corresponding to said slide cross sections whereby each slide fits only one of said channels; and securing means associated with at least one channel means for locking releasably the slide therein.

2. The guiding means of claim 1 wherein one channel is rectangular in cross section and the other channel is circular in cross section.

References Cited in the file of this patent
UNITED STATES PATENTS

| | | |
|---|---|---|
| Re. 17,087 | Billingsley | Sept. 25, 1928 |
| 1,253,705 | Metzger | Jan. 15, 1918 |
| 1,585,535 | Crogan | May 18, 1926 |
| 2,676,624 | Gecmen | Apr. 27, 1954 |
| 2,819,742 | Blachly | Jan. 14, 1958 |